US007823643B2

(12) United States Patent
Wong et al.

(10) Patent No.: US 7,823,643 B2
(45) Date of Patent: Nov. 2, 2010

(54) INSULATION SHROUD WITH INTERNAL SUPPORT STRUCTURE

(75) Inventors: Henry Wong, Houston, TX (US); Michael Mann, Houston, TX (US)

(73) Assignee: FMC Technologies Inc., Houston, TX (US)

(*) Notice: Subject to any disclaimer, the term of this patent is extended or adjusted under 35 U.S.C. 154(b) by 0 days.

(21) Appl. No.: 11/757,654

(22) Filed: Jun. 4, 2007

(65) Prior Publication Data
US 2008/0029270 A1 Feb. 7, 2008

(51) Int. Cl.
*E21B 36/00* (2006.01)
*E21B 7/12* (2006.01)
(52) U.S. Cl. .................. 166/302; 166/360; 166/345; 166/356; 138/149
(58) Field of Classification Search ................ 166/338, 166/345, 356, 360, 368; 405/224.4, 169; 138/149
See application file for complete search history.

(56) References Cited

U.S. PATENT DOCUMENTS

| 122,396 | A | * | 1/1872 | McIlhenny | 292/307 B |
|---|---|---|---|---|---|
| 968,759 | A | * | 8/1910 | Fogg | 292/307 B |
| 1,108,840 | A | * | 8/1914 | Franke | 137/375 |
| 1,965,998 | A | * | 7/1934 | Williams | 175/325.6 |
| 2,675,687 | A | * | 4/1954 | Philipp | 62/275 |
| 2,741,268 | A | * | 4/1956 | Plunkett | 138/148 |
| 3,063,500 | A | * | 11/1962 | Logan | 166/351 |
| 3,724,491 | A | * | 4/1973 | Knudsen et al. | 137/375 |
| 3,741,252 | A | * | 6/1973 | Williams | 138/110 |
| 3,777,501 | A | * | 12/1973 | Sharp et al. | 62/50.7 |
| 3,911,961 | A | * | 10/1975 | Peyton et al. | 138/113 |
| 3,935,632 | A | * | 2/1976 | Maxson | 29/455.1 |
| 4,162,093 | A | * | 7/1979 | Sigmund | 285/47 |
| 4,207,918 | A | * | 6/1980 | Burns et al. | 137/375 |
| 4,258,794 | A | * | 3/1981 | Sizer et al. | 166/356 |
| 4,259,981 | A | * | 4/1981 | Busse | 137/375 |
| 4,298,218 | A | | 11/1981 | Britch | 285/3 |
| 4,300,373 | A | * | 11/1981 | Camos et al. | 70/232 |
| 4,335,740 | A | | 6/1982 | Boley | 137/364 |
| 4,366,970 | A | * | 1/1983 | Hogan, Jr. | 285/45 |
| 4,543,998 | A | * | 10/1985 | Thomerson | 138/110 |
| 4,615,543 | A | * | 10/1986 | Cannon | 285/12 |
| 4,657,050 | A | | 4/1987 | Patterson | 138/149 |
| 4,676,695 | A | | 6/1987 | Duthweiler | 405/157 |

(Continued)

FOREIGN PATENT DOCUMENTS

GB 2165910 A * 4/1986

(Continued)

OTHER PUBLICATIONS

PCT Written Opinion and Search Report from PCT/US07/70373 dated Aug. 26, 2008.

(Continued)

*Primary Examiner*—Thomas A Beach
(74) *Attorney, Agent, or Firm*—Williams, Morgan & Amerson, P.C.

(57) ABSTRACT

The present invention is directed to an insulation shroud with internal support structure. In one illustrative embodiment, the insulation shroud includes a body adapted to be positioned around a subsea component, the body including an insulating material having an internal support structure positioned therein and a door.

12 Claims, 9 Drawing Sheets

U.S. PATENT DOCUMENTS

| | | | | |
|---|---|---|---|---|
| 4,696,324 A * | 9/1987 | Petronko | ..................... | 137/375 |
| 4,715,439 A * | 12/1987 | Fleming | ..................... | 166/68 |
| 4,716,926 A * | 1/1988 | Jacobs | ..................... | 137/375 |
| 4,807,669 A * | 2/1989 | Prestidge, Sr. | ............. | 138/178 |
| 4,824,705 A | 4/1989 | Persson et al. | ............. | 428/35.9 |
| 4,826,215 A * | 5/1989 | Sullivan | ..................... | 285/80 |
| 4,925,605 A * | 5/1990 | Petronko | ..................... | 264/46.6 |
| 4,972,759 A * | 11/1990 | Nelson | ..................... | 122/494 |
| 5,193,937 A | 3/1993 | Miller | ..................... | 405/157 |
| 5,280,766 A | 1/1994 | Mohn | ..................... | 166/368 |
| 5,289,561 A | 2/1994 | Costa Filho | ................. | 392/478 |
| 5,303,744 A * | 4/1994 | Eriksson | ..................... | 138/110 |
| 5,402,830 A * | 4/1995 | Dortzbach | ..................... | 138/110 |
| 5,713,394 A * | 2/1998 | Nygaard | ..................... | 138/149 |
| 5,791,379 A * | 8/1998 | Piorkowski | ..................... | 138/110 |
| 5,797,415 A * | 8/1998 | Nicholson et al. | ......... | 137/15.01 |
| 5,838,637 A | 11/1998 | Constantinou | ............. | 367/173 |
| 5,883,517 A | 3/1999 | Broyde et al. | ............. | 324/522 |
| 5,941,287 A * | 8/1999 | Terito et al. | ................ | 138/149 |
| 5,979,506 A | 11/1999 | Aarseth | ..................... | 138/33 |
| 6,142,707 A | 11/2000 | Bass et al. | ................. | 405/158 |
| 6,264,401 B1 | 7/2001 | Langner et al. | ............. | 405/169 |
| 6,278,095 B1 | 8/2001 | Bass et al. | ................. | 219/629 |
| 6,278,096 B1 | 8/2001 | Bass | ..................... | 219/629 |
| 6,284,809 B1 * | 9/2001 | Plummer et al. | ............. | 521/54 |
| 6,371,693 B1 | 4/2002 | Kopp et al. | ................. | 405/158 |
| 6,417,457 B1 | 7/2002 | Aasbo et al. | ............. | 174/120 R |
| 6,509,557 B1 | 1/2003 | Bass | ..................... | 219/772 |
| 6,520,261 B1 * | 2/2003 | Janoff et al. | ................. | 166/350 |
| 6,564,011 B1 | 5/2003 | Janoff et al. | ................. | 392/480 |
| 6,686,745 B2 | 2/2004 | Bass | ..................... | 324/522 |
| 6,726,831 B2 | 4/2004 | Bass et al. | ................. | 205/740 |
| 6,814,145 B2 | 11/2004 | Maberry et al. | ............. | 166/294 |
| 6,889,770 B2 | 5/2005 | Qvam et al. | ................. | 166/356 |
| 7,073,593 B2 | 7/2006 | Hatton et al. | ............... | 166/367 |
| 7,181,980 B2 | 2/2007 | Wium | ..................... | 73/861.04 |
| 2003/0010499 A1 | 1/2003 | Qvam et al. | ................. | 166/335 |
| 2003/0015436 A1 | 1/2003 | Bass et al. | ................. | 205/740 |
| 2003/0016028 A1 | 1/2003 | Bass | ..................... | 324/642 |
| 2004/0060693 A1 | 4/2004 | Bass et al. | ..................... | 166/57 |
| 2004/0074649 A1 | 4/2004 | Hatton et al. | ............... | 166/358 |
| 2005/0047871 A1 | 3/2005 | Lee et al. | .................. | 405/154.1 |
| 2005/0241410 A1 | 11/2005 | Wium | ..................... | 73/861.04 |
| 2006/0118308 A1 | 6/2006 | Saucier | ..................... | 166/344 |
| 2006/0243471 A1 | 11/2006 | Karlsen et al. | ............. | 174/15.1 |
| 2006/0266523 A1 * | 11/2006 | Lower | ..................... | 166/346 |
| 2007/0044992 A1 | 3/2007 | Bremnes | ................. | 174/102 R |
| 2007/0048093 A1 | 3/2007 | Bhat et al. | ................. | 405/224.2 |
| 2007/0056729 A1 | 3/2007 | Pankratz et al. | ............. | 166/265 |
| 2007/0131300 A1 * | 6/2007 | Lounders et al. | ............ | 138/149 |
| 2007/0163666 A1 | 7/2007 | Lee et al. | .................... | 138/149 |
| 2008/0063478 A1 * | 3/2008 | Reddy | ..................... | 405/154.1 |

FOREIGN PATENT DOCUMENTS

WO     WO 9940358 A1 *    8/1999

OTHER PUBLICATIONS

Examiner's first report on Australian Patent Application No. 2007256744 dated May 6, 2010.

* cited by examiner

INSULATION SHROUD WITH INTERNAL SUPPORT STRUCTURE

BACKGROUND OF THE INVENTION

1. Field of the Invention

The present invention generally relates to subsea production facilities, and more particularly, to an insulation shroud with an internal support structure.

2. Description of the Related Art

There are thousands of subsea oil and gas wells, and associated production equipment, located throughout the world. Such subsea facilities include numerous pipe designs and connectors that are employed to connect various items of subsea equipment to one another. In many subsea hydrocarbon fields, a certain amount of water is produced along with the hydrocarbons. This is commonly known as the water cut. As fields approach the end of their productive lives, the water cut can exceed 50% or more of the produced fluid. Another contributor of water cut may be seawater that is injected to maintain reservoir pressure. This injected seawater can be produced back by the production wells. When the right combination of high pressure and low temperature is present, this mixture of produced hydrocarbons and produced water has the potential to form solid hydrates, which can form blockages in the production system. This is a common problem in deepwater wells, because of the high hydrostatic pressure and the low temperature of the surrounding seawater.

In normal operation, the produced fluid flows through the production equipment at a temperature well above the hydrate formation temperature. As the fluid continues to flow to a surface facility, it does not have time to cool, and thus hydrate formation is not an issue. However, situations can occur which require a planned or unplanned shutdown of the production system for extended periods of time. When this occurs, the produced fluid that remains trapped in the production equipment located above the floor of the ocean is cooled by the surrounding seawater. If this trapped fluid remains static for too long, it will cool below the hydrate formation temperature and solid hydrates may form. Avoiding hydrates and wax blockages is an important aspect of subsea systems flow assurance management, system reliability, and safety of subsea production systems. The subsea industry has increased focus on flow management issues significantly due to the more challenging environments encountered in deepwater fields and the high cost of remediation.

Figure 1:
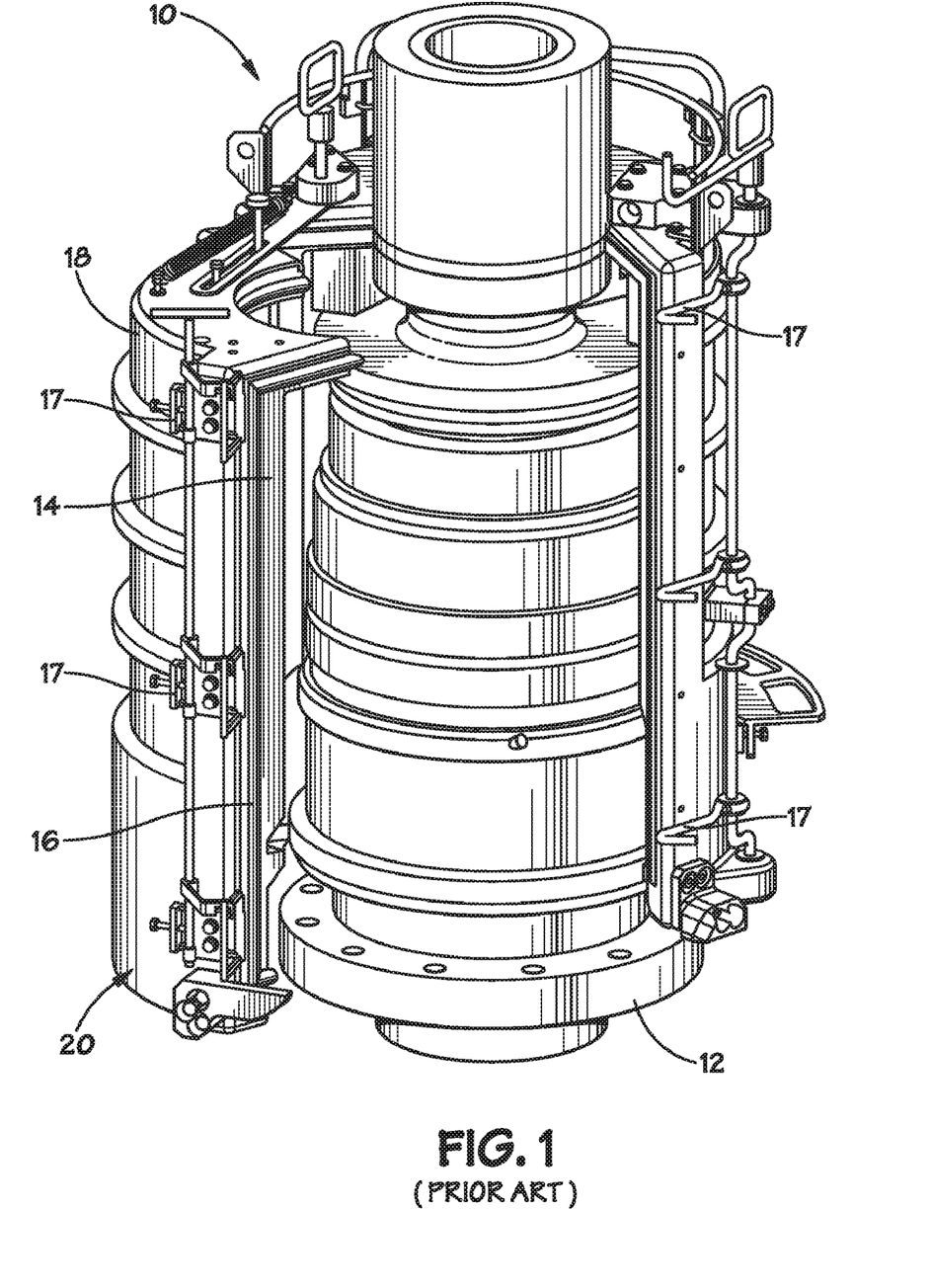
FIG. 1 is a perspective view of an illustrative prior art insulation shroud.

One technique that is employed in an effort to prevent or reduce hydrate formation is to provide insulation around the components to delay the cooling of the hydrocarbon fluid. FIG. 1 depicts an illustrative embodiment of a prior art insulating shroud 10 employed with subsea connectors 12 to prevent or reduce hydrate formation. The prior art insulating shroud 10 comprises insulation material 14, a seal 16, and an outer plastic shell 18. The shroud 10 further comprises a hinged door 20 with latches 17 that is adapted to be closed after the shroud 10 is positioned around the subsea connector 12. The outer plastic shell 18 is designed to, among other things, provide rigidity to the insulation 14. The insulation 14 must be rigid enough such that it does not distort under its own weight, and thereby allows the shroud 10 to seal against the connector 12 when it is installed for it to serve its insulating function.

While the prior art design depicted in FIG. 1 has proven to be acceptable, there are problems associated with the use of such a design. First, given the techniques employed in making the outer plastic shell 18, it is difficult to obtain shells 18 with sufficient dimensional accuracy. Additionally, the tooling used to make the prior art outer plastic shells 18 is relatively expensive and does not readily allow the profile of the outer plastic shell 18 to be changed as system requirements change.

The present invention is directed to various devices and methods for solving, or at least reducing the effects of, some or all of the aforementioned problems.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to an insulation shroud with internal support structure. In one illustrative embodiment, the insulation shroud comprises a body adapted to be positioned around a subsea component, the body including an insulating material having an internal support structure positioned therein and a door.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
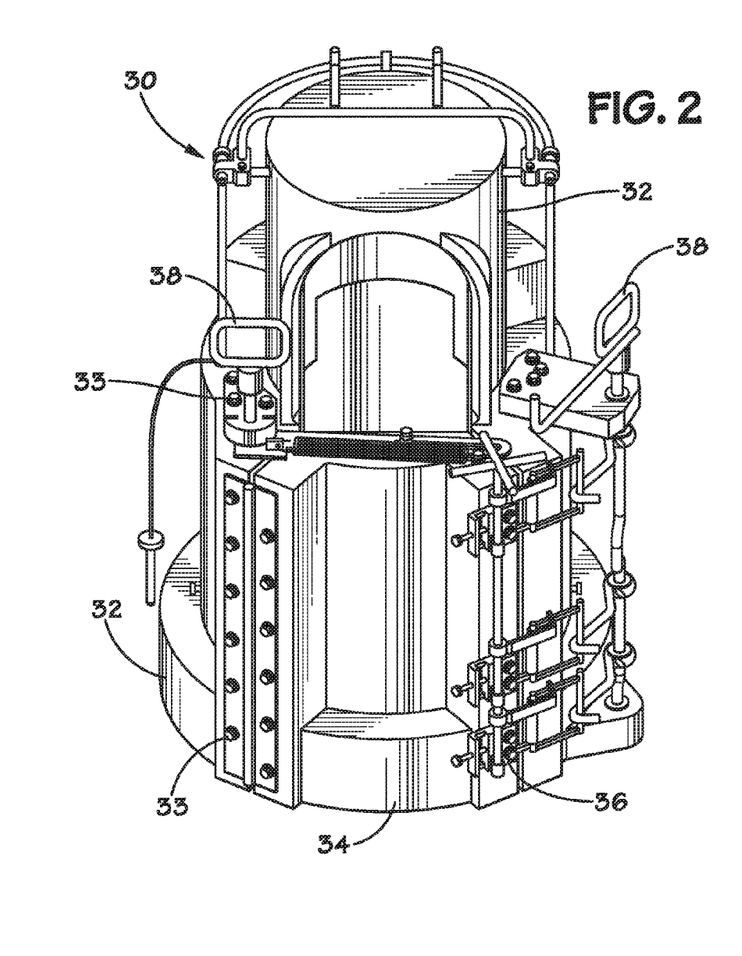
FIG. 2 is a perspective view of an illustrative embodiment of an insulation shroud in accordance with one embodiment of the present invention.
Figure 3:
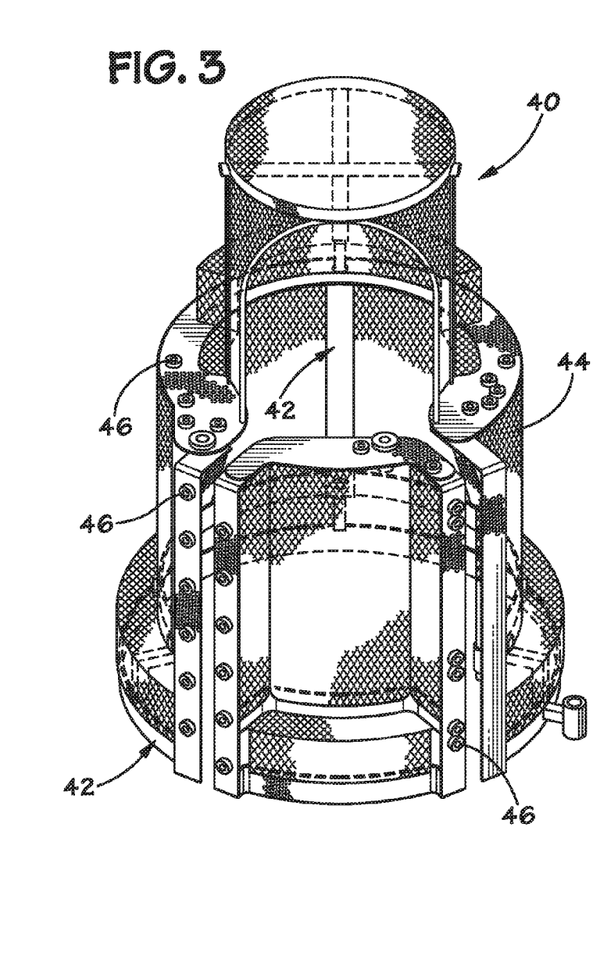
FIG. 3 is a perspective view of a portion of one illustrative embodiment of the internal support structure for the shroud disclosed herein.

FIG. 2 is a perspective view of one illustrative embodiment of an insulation shroud 30 in accordance with one illustrative embodiment of the present invention. FIG. 3 is a perspective view of an illustrative internal support structure 40 that is positioned within the insulating material 32 of the shroud 30, as described more fully below. After a complete reading of the present application, those skilled in the art will understand that the insulation shroud 30 disclosed herein may be manufactured in any desired shape or configuration, and that it may be adapted to insulate any type of subsea device or equipment, e.g., piping, connectors, etc. Thus, the present invention should not be considered as limited to any particular shape or configuration, or for use with any particular subsea item or device.

Figure 4:
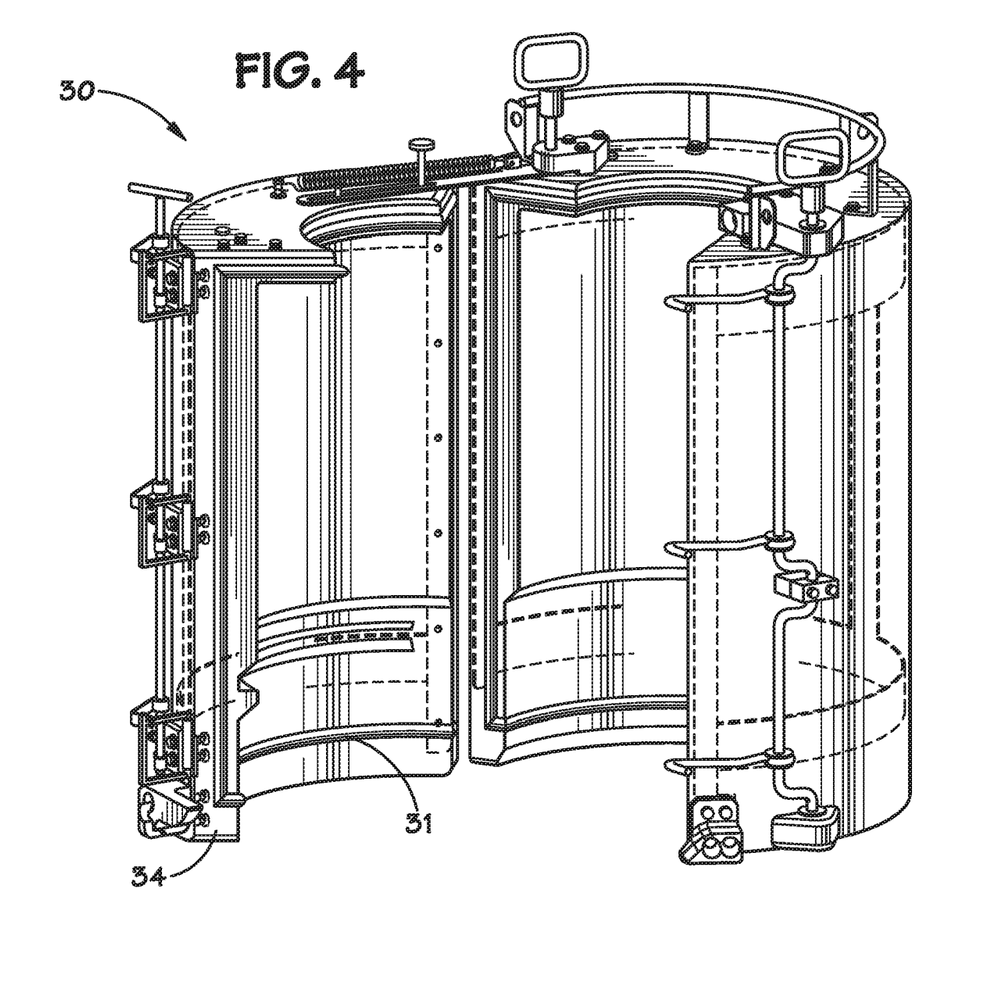
FIG. 4 is a perspective view of an illustrative shroud in accordance with the present invention with its door open.

As shown in FIG. 2, the insulation shroud 30 comprises insulating material 32, a door 34, a plurality of latches 36, illustrative external hardware 33, and various ROV (remote operated vehicle) handles 38 to facilitate use of an ROV to install the shroud 30. Of course, the handles 38 may also be used by divers when they are used to install or release the shroud 30. The particular details as to the type of external hardware 33 and latches 36 employed may vary depending on the particular applications. Moreover, the details regarding the hardware 33 and latches 36 are not considered critical to the present invention. FIG. 4 is a depiction of the illustrative shroud 30 disclosed herein with its door 34 open. As shown therein, the shroud 30 also comprises a seal 31. The type, thickness and insulating properties of the insulating material 32 may vary depending upon the particular application. In one illustrative embodiment, the insulating material 32 may be an FMC Novolastic brand of insulation comprised of Novolastic HT material having a wet R value of approximately 0.1 Btu/ft-hr ° F. and a specific gravity of approximately 0.95-1.05.

Figure 5:
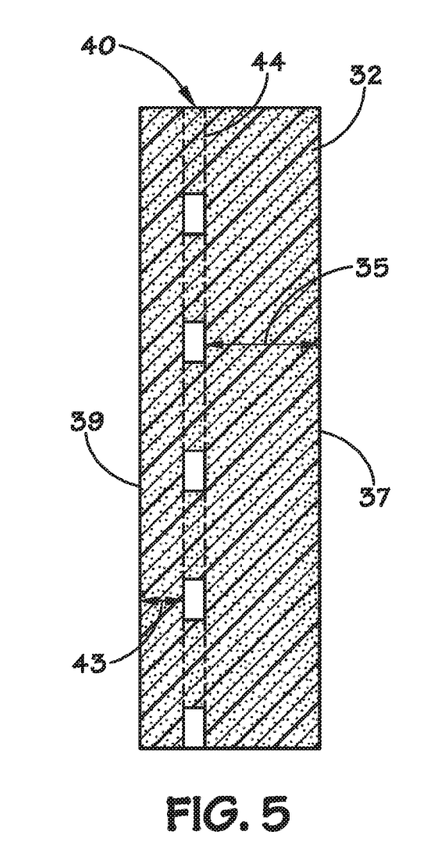
FIG. 5 is a schematic cross-sectional view of a portion of the insulating material showing the internal support structure.

FIG. 5 is a schematic cross-sectional view of the insulating material 32 having the internal support structure 40 positioned therein. The insulating material 32 has an inner surface 37 (closest to the connector or structure to be insulated) and an outer surface 39. In general, the internal support structure 40 may be positioned at any desired location in the insulating material 32. In one illustrative embodiment, the internal support structure 40 is positioned a maximum distance 35 of approximately two inches from the inner surface 37 of the insulating material 32 so as to not degrade the insulating function of the insulating material 32 by locating a more effective heat conductor too closely to the connector. Of course, the dimension 35 may vary depending on the particular application. Additionally, the internal support structure 40 may be positioned such that it is located as close to the outer surface 39 as practicable while still allowing the insulating material 32 to bond or adhere to the internal support structure 40. In one illustrative embodiment, the internal support structure 40 is positioned a distance 43 of approximately 0.375 inches from the outer surface 39. Of course, the dimension 43 may vary depending on the particular application. In fact, if desired, at least a portion of the internal support structure 40 may be substantially flush with the outer surface 39.

FIG. 3 depicts one illustrative embodiment of an internal support structure 40 for the shroud 30 depicted in FIG. 2. As indicated above, the internal support structure 40 is positioned within the insulating material 32 and thus is not visible in FIG. 2. One purpose of the internal support structure 40 is to provide rigidity to the insulating material 32. To that end, the shape and components of the internal support structure 40 may vary depending upon the particular application. In the illustrative embodiment depicted in FIG. 3, the internal support structure 40 comprises a frame 42 and a mesh material 44. In the depicted embodiment, the frame 42 is comprised of fabricated plate. The frame 42 and the mesh 44 may be assembled using various known techniques, e.g., welded or bolted construction. The internal support structure 40 may be comprised of a variety of materials, e.g., carbon steel, stainless steel, inconel, plastic, etc., as long as such materials are suitable for the intended subsea application. Additionally, after a complete reading of the present application, those skilled in the art will understand that the internal support structure 40 may be comprised of a variety of different structures. For example, the frame 42 may be comprised of various structural shapes, e.g., bar, angle iron, etc. Additionally, the mesh 44 may be replaced with other structures, such as intersecting bars, expanded metal, perforated plate, or the like. Thus, the present invention should not be considered as limited to the illustrative internal support structure 40 described herein. If needed, additional buoyancy may be added to the shroud 30 to offset the additional weight of the internal support structure 40.

Figure 6:
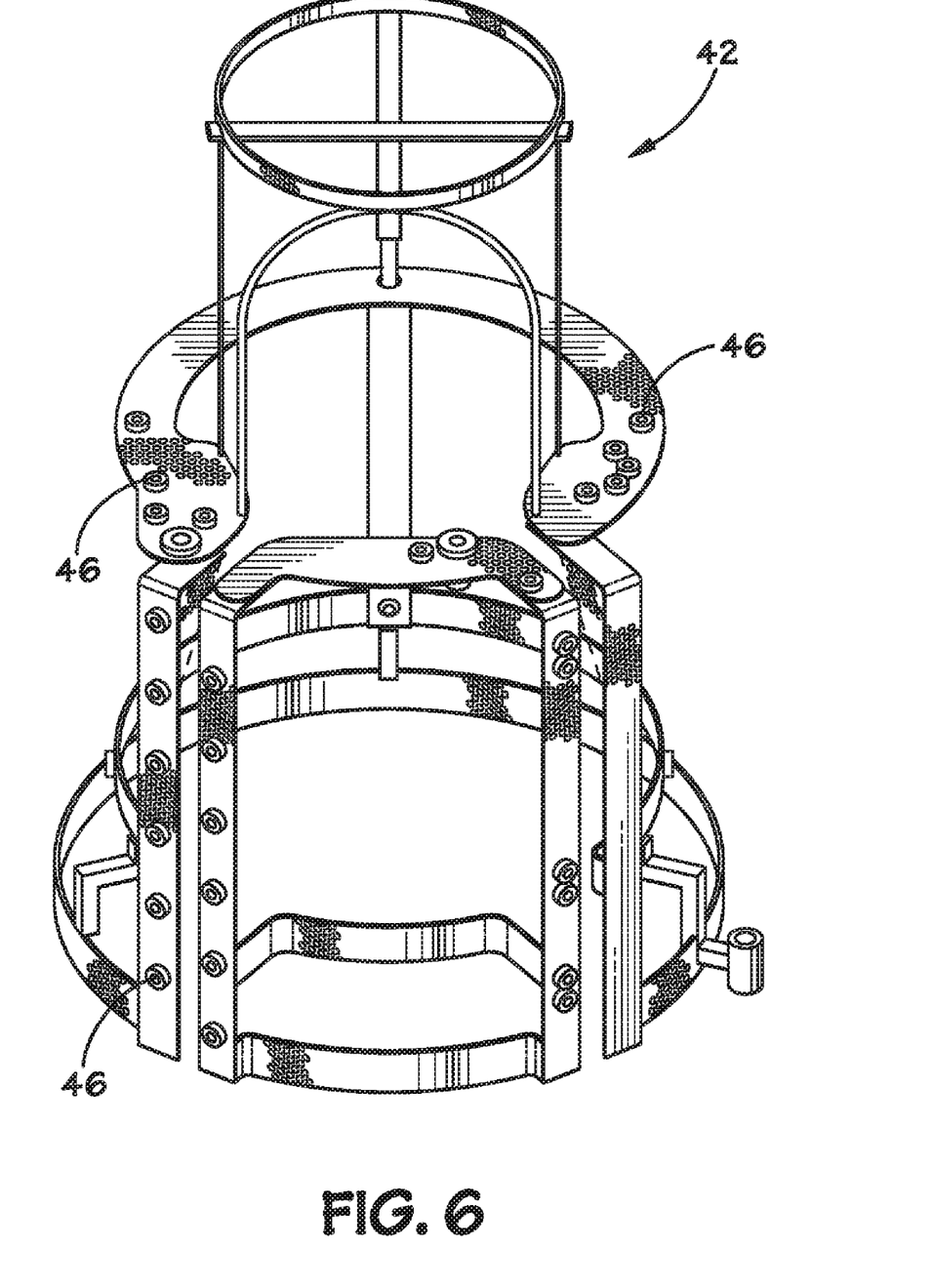
FIG. 6 is a perspective view of one illustrative embodiment of an illustrative frame that may be part of the illustrative internal support structure disclosed herein.
Figure 7:
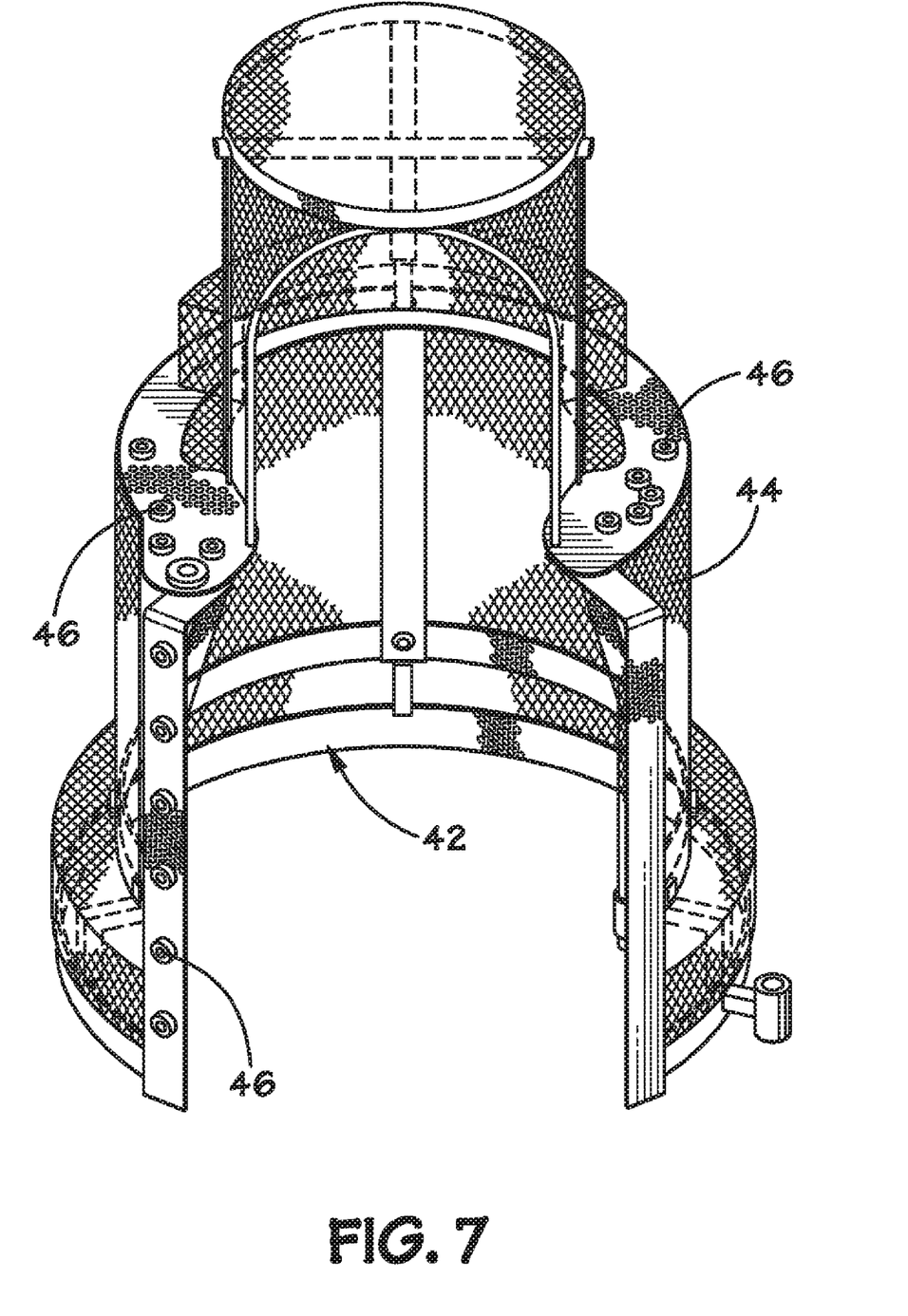
FIG. 7 is a perspective view of one illustrative embodiment of an internal support structure for the shroud disclosed herein.
Figure 8:
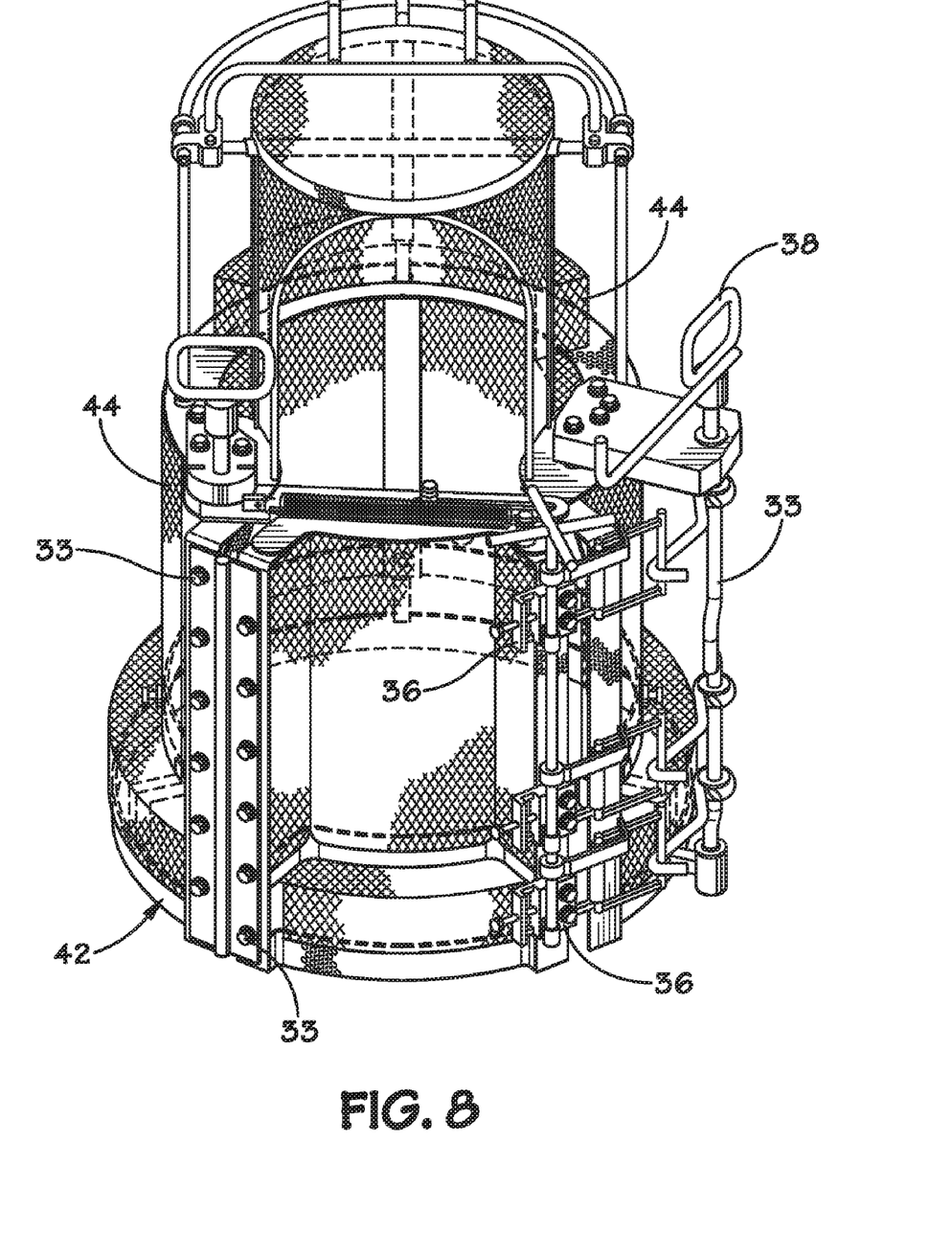
FIG. 8 is a perspective view of the internal support structure depicted in FIG. 7 with various items of hardware attached thereto.

FIG. 6 is a view of one illustrative embodiment of the frame 42 prior to attachment of the mesh 44. The internal hardware components 46 are also attached to the frame 42. FIG. 7 is an enlarged view of the internal support structure 40 at a later stage of fabrication. As shown therein, the mesh 44 has been welded on to the frame 42. Also depicted in FIG. 7 are various items of internal hardware 46 that are employed to position the external hardware 33 (see FIG. 2) on the shroud 30. The hardware 46 is referred to as internal hardware because most of it will be positioned within the insulating material 32. FIG. 8 depicts the internal support structure 40 with various items of the external hardware 33 coupled to the internal support structure 40. FIG. 8 is provided to simply show how the various items of external hardware 33 may be attached to the internal hardware 46 attached to the internal support structure 40.

Figure 9:
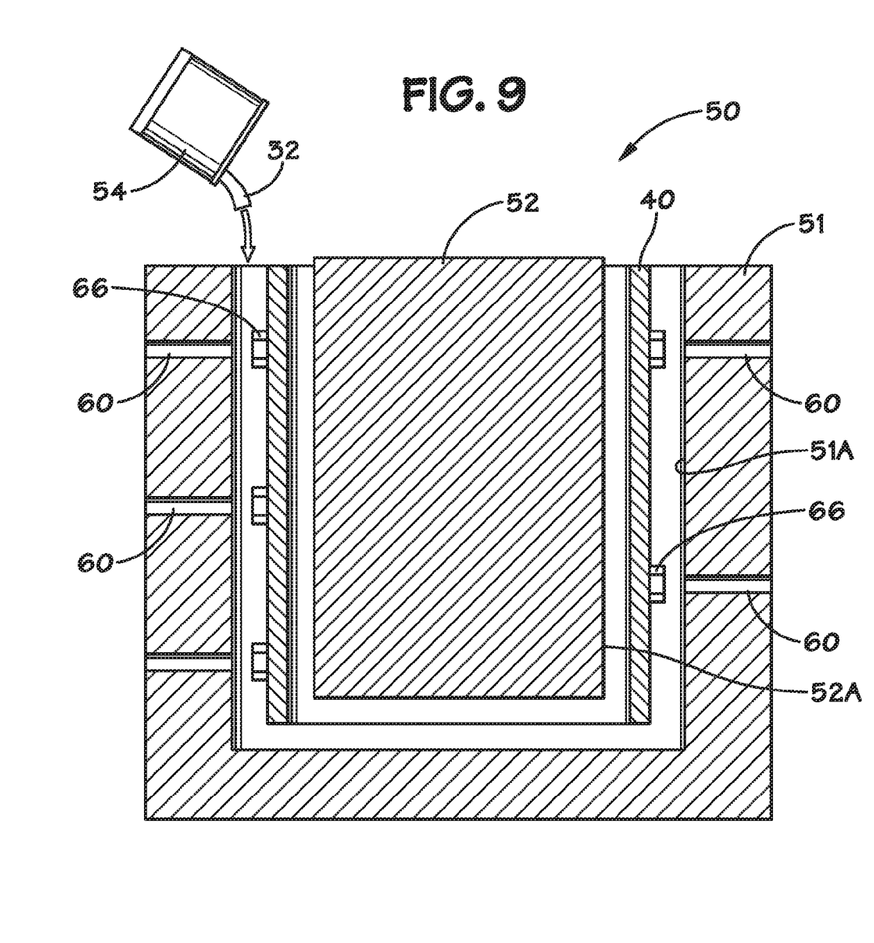
FIG. 9 is a schematic depiction of one illustrative technique that may be employed to form the insulation shroud depicted herein.
Figure 10:
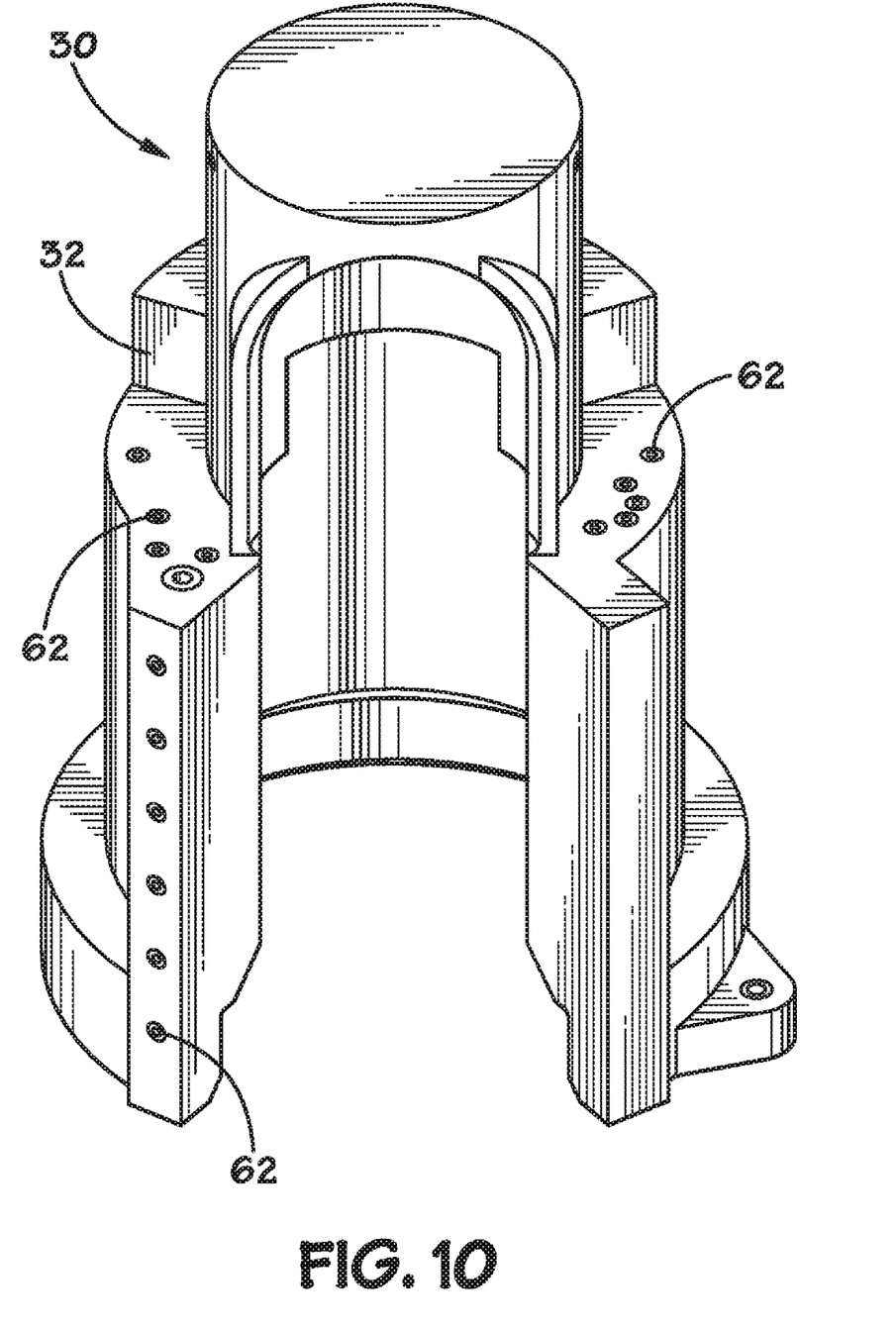
FIG. 10 is a perspective view of one illustrative embodiment of the insulation shroud disclosed herein after it has been removed from a mold.

The present invention may be manufactured using well known molding techniques to form the shroud 30 with the internal support structure 40 positioned in the insulating material 32. FIG. 9 schematically depicts a mold 50 comprised of an outer mold component 51 and an inner mold component 52 that define a space 53 therebetween. The outer mold 51 has an inner surface 51A and the inner mold 52 has an outer surface 52A. The surface 52A may have any desired shape that corresponds, at least in part, to the device or structure to be insulated by the shroud 30, e.g., a connector. Similarly, the surface 51A may have any desired shape or configuration. As indicated in FIG. 9, the internal support structure 40 is positioned in the space 53 in the mold 50. A source 54 of insulating material 32 is then used to introduce insulating material 32 into the space 53 and thereby surround the internal support structure 40 with insulating material 32. Thereafter, the insulating material is allowed to cure. In one illustrative embodiment, the insulating material 32 may be introduced into the space 53 in several different pours. For example, in one illustrative embodiment, the insulating material 32 may be poured in successive layers, e.g., separate rings, each of which are approximately 5-7 inches in height, which are allowed to cure before the next pour is performed. After curing, the mold 50 is broken down, and the shroud 30 is removed from the mold 50. FIG. 10 is a depiction of an illustrative shroud 30 after it has been removed from the mold 50.

Figure 11:
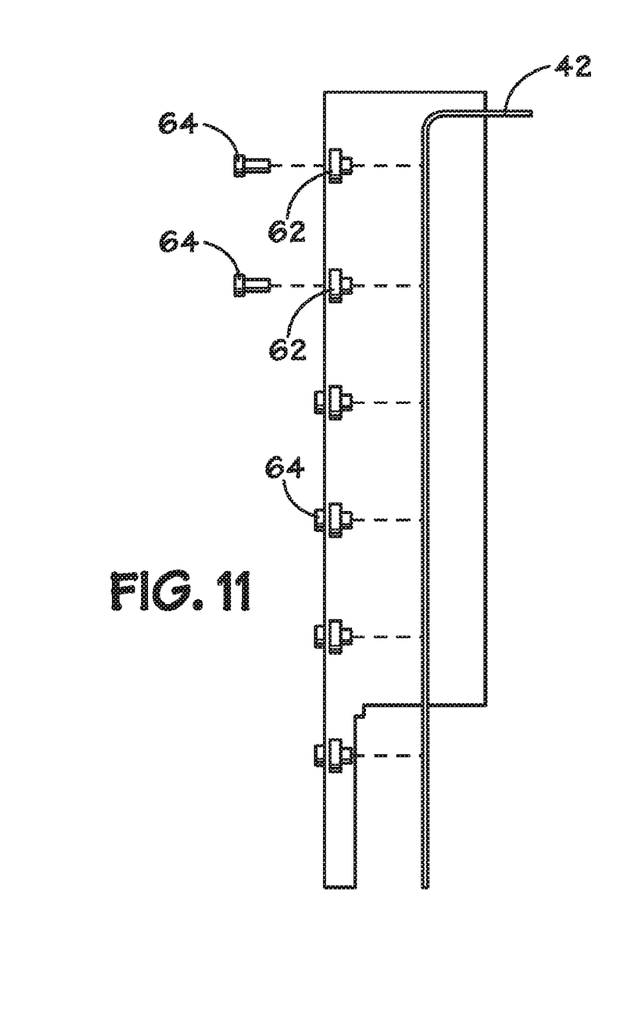
FIG. 11 is a side view depicting how various fasteners are located in the molding process described herein.
Figure 12:
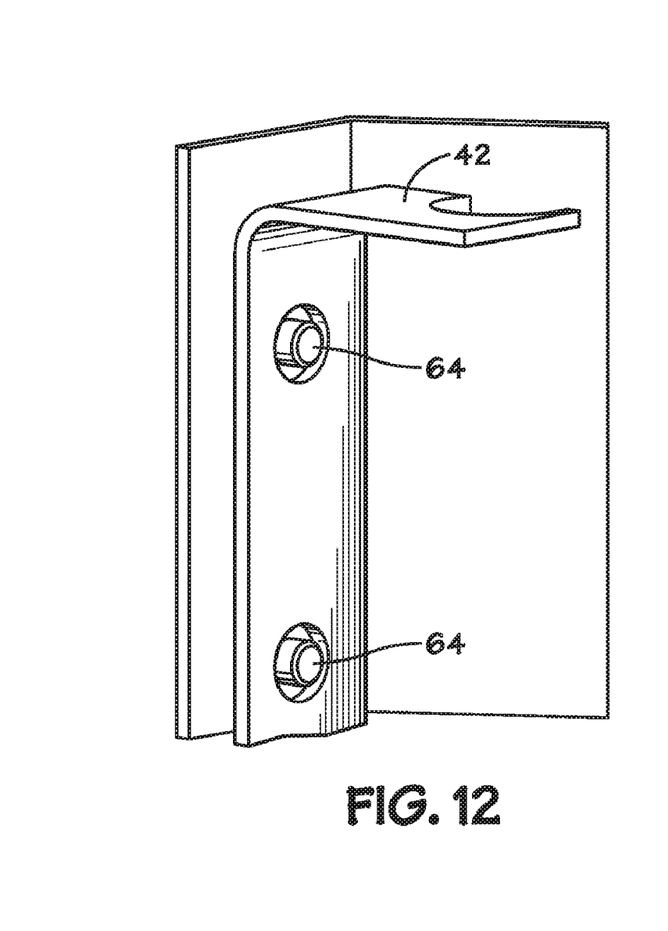
FIG. 12 is an enlarged perspective view of a portion of the internal support structure disclosed herein.

As shown in FIGS. 9 and 11-12, the outer mold 51 has through holes 60 formed therein to allow a bushing 62 and bolt 64 to be bolted to the nut 66 (or tapped bar stock) attached to the frame 42 and/or mesh 44 and remain in place during the molding process. By forming the holes 60 in the outer mold 51, a high degree of accuracy can be achieved as it relates to properly locating the external hardware 33 relative to the internal support structure 40. Once the molding process is complete, the bolts 64 are removed and the external hardware 33 and latches 36 may be secured to the internal support structure 40 by bolting them in the tapped bushing or nut 66.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An insulation shroud, comprising:
    a body adapted to be positioned around a subsea component, wherein said subsea component comprises at least one of a pipe and a connector, said body comprising:
        an insulating material having an internal support structure embedded within the insulating material, wherein said internal support structure is comprised of a fabricated frame structure and a mesh material positioned on said fabricated frame structure, said fabricated frame structure and said mesh material being comprised of a material other than said insulating material; and
        a door operatively coupled to the frame structure.

2. The device of claim 1, wherein said fabricated frame structure comprises at least one of a plate structure, an angle iron and a rod, and a mesh material.

3. The device of claim 1, wherein said device further comprises a plurality of internal hardware items coupled to said frame structure.

4. The device of claim 3, wherein said device comprises a plurality of external hardware items that are coupled to said internal hardware items.

5. The device of claim 1, wherein said shroud is positioned around a subsea component in a subsea environment.

6. A system, comprising:
    a subsea component located in a subsea environment;
    a body positioned around the subsea component, said body comprising:
        an insulating material having an internal support structure embedded within the insulating material, wherein said internal support structure is comprised of a fabricated frame structure and a mesh material positioned on said fabricated frame structure, said fabricated frame structure and said mesh material being comprised of a material other than said insulating material; and
        a door operatively coupled to the frame structure.

7. The system of claim 6, wherein said fabricated frame structure comprises at least one of a plate structure, an angle iron and a rod, and a mesh material.

8. The system of claim 6, wherein said device further comprises a plurality of internal hardware items coupled to said frame structure.

9. The system of claim 8, wherein said device comprises a plurality of external hardware items that are coupled to said internal hardware items.

10. The system of claim 6, wherein said subsea component comprises at least one of a pipe and a connector.

11. The device of claim 6, wherein an outer surface of said internal structure is substantially flush with an outer surface of said insulating material.

12. An insulation shroud, comprising:
    a body adapted to be positioned around a subsea component, said body comprising:
        an insulating material having an internal support structure embedded within the insulating material, wherein said internal support structure is comprised of a fabricated frame structure and a mesh material positioned on said fabricated frame structure, said fabricated frame structure and said mesh material being comprised of a material other than said insulating material, wherein said shroud is positioned around a subsea component in a subsea environment; and
        a door operatively coupled to the frame structure.

* * * * *